W. DARGUE.
COUPLING FOR DRIVING BANDS OR TAPES.
APPLICATION FILED AUG. 31, 1921.

1,413,972.  Patented Apr. 25, 1922.

Inventor
Walter Dargue
by Herbert W. J. Jenner
Attorney.

UNITED STATES PATENT OFFICE.

WALTER DARGUE, OF HALIFAX, ENGLAND.

COUPLING FOR DRIVING BANDS OR TAPES.

1,413,972.   Specification of Letters Patent.   Patented Apr. 25, 1922.

Application filed August 31, 1921. Serial No. 497,125.

*To all whom it may concern:*

Be it known that I, WALTER DARGUE, a subject of King George V of Great Britain, residing at Halifax, in the county of York, England, have invented a new and useful Improvement in Couplings for Driving Bands or Tapes, of which the following is a specification.

This invention has reference to devices for joining together or coupling the ends of driving bands or tapes particularly the flat woven bands or tapes used in textile machines.

My object is to improve upon the present constructions of devices for this purpose and to provide a cheap and simple fastener or coupling which will enable the ends of a band or tape to be quickly and effectively joined.

My improved fastener, and the mode of applying same, as well as a suitable form of tool for use in applying the fastener, are illustrated in the accompanying drawing, in which:—

In constructing a fastener according to my invention, I stamp or otherwise form, from metal strip of suitable gauge and width, a rectangular plate $a$ of the requiste dimensions and having on its two opposing edges or sides a series of sharp-pointed serrations or teeth $a'$, $a'$.

Figure 1:
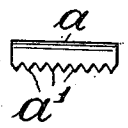
Figs. 1 and 2 are, respectively, a side view and an end view of one of the improved fasteners.
Figure 2:
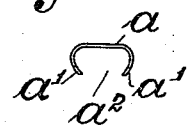

The plate is, by suitable means, curved or bent longitudinally as shown at Fig. 2, in such a manner as to cause the teeth or serrations to incline or point inwardly towards one another, the depth or distance between the points of the teeth and the flat portion or crown of the fatsener being regulated according to the thickness of the band or tape for which the fastener is designed. The gap $a^2$ between the points of the teeth is made or left sufficiently wide to admit of the introduction between them of the doubled ends of the tape or band.

Figure 3:
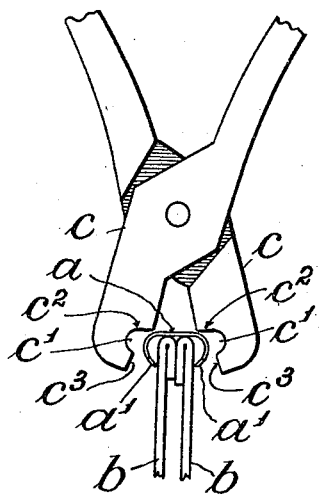
Fig. 3 shows the ends of a band or tape inserted into the fastener ready for the latter to be clinched, the tool for clinching or applying pressure to the fastener being also shown in open position.

In applying the device, the two ends of the band or tape $b$, are doubled back upon themselves for a short distance and placed together with the end portions inwards. The four thicknesses are then introduced into the fastener, as shown at Fig. 3, with the doubled ends in contact with the interior surface of the crown of same.

Figure 4:
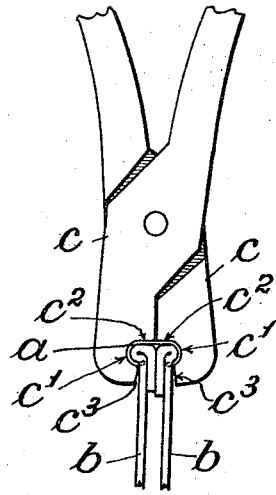
Fig. 4 shows the fastener clinched on to the ends of the band or tape.

By means of a suitable tool, comprising in the instance shown two pivoted jaws $c$, $c$ having in their inner faces suitably shaped recesses $c'$, $c'$, pressure is then applied to the two sides of the fastener or coupler in such a manner that the pointed teeth or serrations $a'$ are caused to be pressed inwardly and upwardly. The points of the teeth enter the outer layers of the doubled tape or band, and, as the pressure is continued, force the ends tightly up into the fastener or coupler, as shown at Fig. 4.

The upper portions of the jaws $c$, $c$ are shouldered as at $c^2$, $c^2$ to form abutments for the crown of the fastener while the pressure is being applied and prevent distortion of the fastener, whilst the final distance between the jaws, when fully closed, corresponds to the desired width of the fastener when clinched or pressed. The lower portion of each jaw is relieved or set back and formed at an angle, as indicated at $c^3$, to give the requisite clearance to accommodate the doubled ends of the band or tape when the jaws are closed.

Any other suitable form of tool, by means of which the desired pressure can be obtained, may be employed instead of that shown.

The points of the teeth $a'$ having been pressed inwardly and upwardly and the ends of the band or tape thus gripped and secured as above set forth, a further locking or gripping action may be obtained by flattening out the fastening or coupler by pressure applied to the crown of same.

Figure 5:
Fig. 5 shows the completed joint, on a somewhat larger scale than the preceding figures.

Any superfluous length of the doubled in ends of the band or tape are trimmed off on the face or running side of the tape, as indicated at Fig. 5 which shows the completed joint, before the flattening mentioned is done.

The coupler or fastener is made slightly less in length than the width of the band or tape to be joined, so that the ends of the coupler, when applied, are clear of the edges of the band or tape.

No portion of the coupler approaches the working face of the band or tape, nor does the joint form any projection or excrescence towards the working face, which is left perfectly flat and smooth.

Having thus described my invention, what I claim as new and desire to secure by Letters Patent is:—

A belt fastener, comprising a plate provided with arcuate end portions having serrated edges, said end portions being adapted to receive the doubled end portions of belts and hold the same in folded condition with the serrated edges of the plate pressed into the outer folds of the belts and arranged substantially in line with each other.

In testimony whereof I affix my signature.

WALTER DARGUE.